United States Patent [19]

Tazelaar et al.

[11] Patent Number: 5,742,889
[45] Date of Patent: Apr. 21, 1998

[54] IMAGE FORMING APPARATUS COMPRISING AN INTERMEDIATE TRANSFER MEDIUM HAVING A PERFLUOROPOLYETHER TOP LAYER

[75] Inventors: Frans Willem Tazelaar, Venlo; Peter Richard Markies, Grubbenvorst; Johannes Adrianus Van Den Reek, Eindhoven; Cornelius J. M. Van Der Stappen, Nijmegen, all of Netherlands

[73] Assignee: OCE-Nederland B.V., Ma Venlo, Netherlands

[21] Appl. No.: 735,339

[22] Filed: Oct. 22, 1996

[30] Foreign Application Priority Data

Oct. 23, 1995 [NL] Netherlands ............................ 1001471
Oct. 23, 1995 [NL] Netherlands ............................ 1001472

[51] Int. Cl.$^6$ ..................................................... G03G 15/16
[52] U.S. Cl. ........................... 399/308; 399/307; 430/126; 528/15
[58] Field of Search ............................. 399/302, 307, 399/308, 313, 350; 430/124, 126, 56, 66, 67, 58; 528/15

[56] References Cited

U.S. PATENT DOCUMENTS

| | | |
|---|---|---|
| 4,453,820 | 6/1984 | Suzuki ............................... 399/308 |
| 4,588,279 | 5/1986 | Fukuchi et al. ..................... 399/308 |
| 4,607,947 | 8/1986 | Ensing et al. ....................... 399/308 |
| 4,772,526 | 9/1988 | Kan et al. ............................. 430/58 |
| 4,825,249 | 4/1989 | Oki et al. ............................ 399/350 |
| 5,334,477 | 8/1994 | Bugner et al. ..................... 430/126 |
| 5,342,913 | 8/1994 | Takago et al. ....................... 528/15 |
| 5,430,533 | 7/1995 | Dreyfuss et al. ................... 399/308 |
| 5,519,476 | 5/1996 | Dalal et al. ......................... 399/307 |
| 5,530,532 | 6/1996 | Shuji et al. ......................... 399/237 |
| 5,635,578 | 6/1997 | Arai et al. ............................ 528/15 |
| 5,665,846 | 9/1997 | Sato et al. ........................... 528/15 |

*Primary Examiner*—Arthur T. Grimley
*Assistant Examiner*—Sophia S. Chen
*Attorney, Agent, or Firm*—Birch, Stewart, Kolasch & Birch, LLP

[57] ABSTRACT

Apparatus for transferring a toner image from an image-forming medium to a receiving material with an intermediate medium with a top layer which intermediate medium is in contact with the image-forming medium in a first transfer zone. A heating member is provided for heating the toner image on the intermediate medium. A biasing member is provided in a second transfer zone which can be brought into contact with the intermediate medium. A transport member is provided for transporting the receiving material through the second transfer zone, wherein the top layer contains a perfluoropolyether rubber.

15 Claims, 2 Drawing Sheets

IMAGE FORMING APPARATUS COMPRISING AN INTERMEDIATE TRANSFER MEDIUM HAVING A PERFLUOROPOLYETHER TOP LAYER

BACKGROUND OF THE INVENTION

1. Field of the Invention

The invention relates to an apparatus for transferring a toner image from an image-forming medium to a receiving material comprising: an endless movable intermediate medium comprising a support provided with a top layer which is secured to the support via its rear, the intermediate medium being in contact with the image-forming medium in a first transfer zone, heating means for heating the toner image on the top layer of the intermediate medium, a biasing means which can be brought into contact with the intermediate medium in a second transfer zone, and transport means for transporting the receiving material through the second transfer zone.

2. Description of Background Art

As set forth in U.S. Pat. No. 4,607,947, a contact fixing device is disclosed in which a toner image is transferred from an image-forming medium to a heated intermediate medium. In a fixing zone in which the intermediate medium is in contact with a biasing means, the toner image is then transferred and simultaneously fixed on a receiving material transported through the fixing zone.

Although the top layer material used in this disclosure is reasonably suitable for the application, improvements in respect of mechanical permanence and chemical resistance are desirable.

The requirements that the top layer has to meet are high. For example, the toner present on the image-forming medium must be transferred as completely as possible to the intermediate medium or intermediate in the first zone and then the toner on the intermediate must be transferred in the second zone as completely as possible to the receiving material. The top layer must accordingly have good release properties. There is a pressing demand for a top layer material for use on an intermediate to satisfy these requirements and which is in addition of sufficient mechanical permanence and chemical resistance.

Fluorosilicone rubbers have been proposed in the past in order to improve chemical resistance. However, these rubbers have inadequate mechanical permanence. Also, the top layers used heretofore are sensitive to various impurities, e.g. toner residues, various low-melting impurities from receiving materials, such as plasticizers, waxes, sizing agents from receiving papers, and the like. If such impurities remain on the intermediate, they may be transferred to the image-forming medium in the first transfer zone. This disturbs the image formation and ultimately therefore results in image faults in the copy on the receiving material.

SUMMARY AND OBJECTS OF THE INVENTION

The object of the invention is to provide apparatus for transferring a toner image from an image-forming medium to a receiving medium which includes an endless movable intermediate medium including a support provided with a top layer which is secured to the support via its rear, the intermediate medium being in contact with the image-forming medium in a first transfer zone. A heating member is provided for heating the toner image on the top layer of the intermediate medium. A biasing member may be brought into contact with the intermediate medium in a second transfer zone. A transport member is provided for transporting the receiving material through the second transfer zone. The top layer does not have the above problems or else only to a reduced degree. To this end, according to the invention, the top layer contains perfluoropolyether chains. A top layer of this kind gives very good resistance to various low-melting impurities from receiving materials, such as plasticizers, waxes, sizing agents from receiving papers, and the like.

Preferably, linear perfluoropolyether chains are used in which $(CF_2.CF_2-O)_m-(CF_2O)_n$ groups are present. The presence of these groups ensures a very low glass transition temperature (Tg) so that even at lower temperatures good elastic properties are retained. The $CF_2CF_2O$ and $CF_2O$ groups can be distributed arbitrarily over the chains (random polymerization). Block copolymers can also be used wherein blocks of these $CF_2CF_2O$ units are coupled to blocks of several $CF_2O$ units.

It has been found advantageous to prepare this rubber from bifunctional perfluoropolyether oils such as HO-perfluoropolyether-OH. These oils provide rubbers with very good flexibility. Preferably, the bifunctional polyether oils have a mass averaged molecular weight (Mw) of 1,000–20,000.

It is a simple matter to prepare such oils from commercial products with lower molecular weights by chain lengthening of the lower molecular oils.

In one embodiment of the apparatus according to the invention, the top layer is prepared with HO-perfluoropolyether-OH and the chain lengthener used is

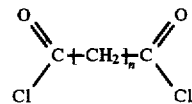

where n=0-4.

Preferably, the chain lengthener used is

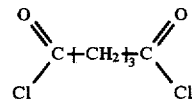

This chain lengthener gives fast and well-reproduced reactions.

In another embodiment, the top layer is prepared with a mixture of HO-perfluoropolyether-OH and OCN-perfluoropolyether-NCO to give a rubber with a good adjustable elasticity at the working temperature. The good elasticity ensures very good release properties for the rubber, this property denoting the maximum transfer of toner image from the intermediate to the receiving material.

Suitable catalysts for the curing of urethane perfluoropolyethers are dibutyl tin dilaurate, dibutyl tin oxide, various iron derivatives such as ferroacetyl acetonate, tertiary amines etc, in quantities from 0.001 to 2% by weight. The possibly chain-lengthened perfluoropolyether oils are preferably terminated with terminal groups chosen from the group of acrylates and urethane acrylates. Strong chemically resistant rubbers are obtained in a simple way in such cases. Perfluoropolyethers with (meth) acrylate or urethane (meth) acrylate terminal groups can be cross-linked:

1) with the aid of peroxides such as dibenzoyl peroxide, 2,5-bis(ter-butylperoxy)-2,5-dimethylhexane, terbutylperoxybenzate, benzophenone, etc in quantities from 0.1 to 3% by weight in combination with heat (>100° C.) and 2) with the aid of photo-initiators such as α,α-diethoxyacetophenone, o-nitrobenzene diazonium hexafluoroantimonate, fluorenone, triphenyl amines, benzoin alkyl ethers, carbazole, etc, in combination with UV light.

In another embodiment, the possibly chain-lengthened perfluoropolyether oils are preferably terminated with

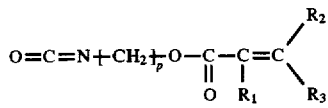

where p=1-5
and $R_1$, $R_2$ and $R_3$ are jointly and independently chosen from H or a lower alkyl group, chosen from the group methyl, ethyl, n-propyl, isopropyl, n-butyl, i-butyl and t-butyl and n-pentyl or with a compound from the group O=C=N—($CH_2$)p— Si(O$R_4$)$_3$ where p has the same meaning as defined above and $R_4$ is chosen from the group methyl, ethyl, n-propyl and i-propyl, whereafter these derivatized perfluoropolyether oils are cross-linked under the influence of a suitable catalyst. These terminated oils can be cured very simply in air by the influence of the water in air.

Suitable wet-curing catalysts are tin salts such as tin(II) octanate, tin(II) hexafluoroacetylacetonate, tin(II) oxides and various titanium salts.

A great advantage of the perfluoropolyether rubbers is their high chemical resistance. Impurities from the receiving materials are barely taken up by the rubbers, if at all. For example it is possible to use these rubbers on their own on thin films without the use of an intermediate layer. These belts have a low thermal capacity so that less energy supply during use is possible.

In one particular embodiment the top layer is applied to a transparent or non-transparent EPDM under layer or intermediate layer in order to receive low-melting impurities from the top layer. In this way the top layers are kept practically free of low-melting impurities. Of course all kinds of additions to the top layer are possible. Known fillers for the top layer rubbers can be applied, e.g. carbon, silica, metal salts, and the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
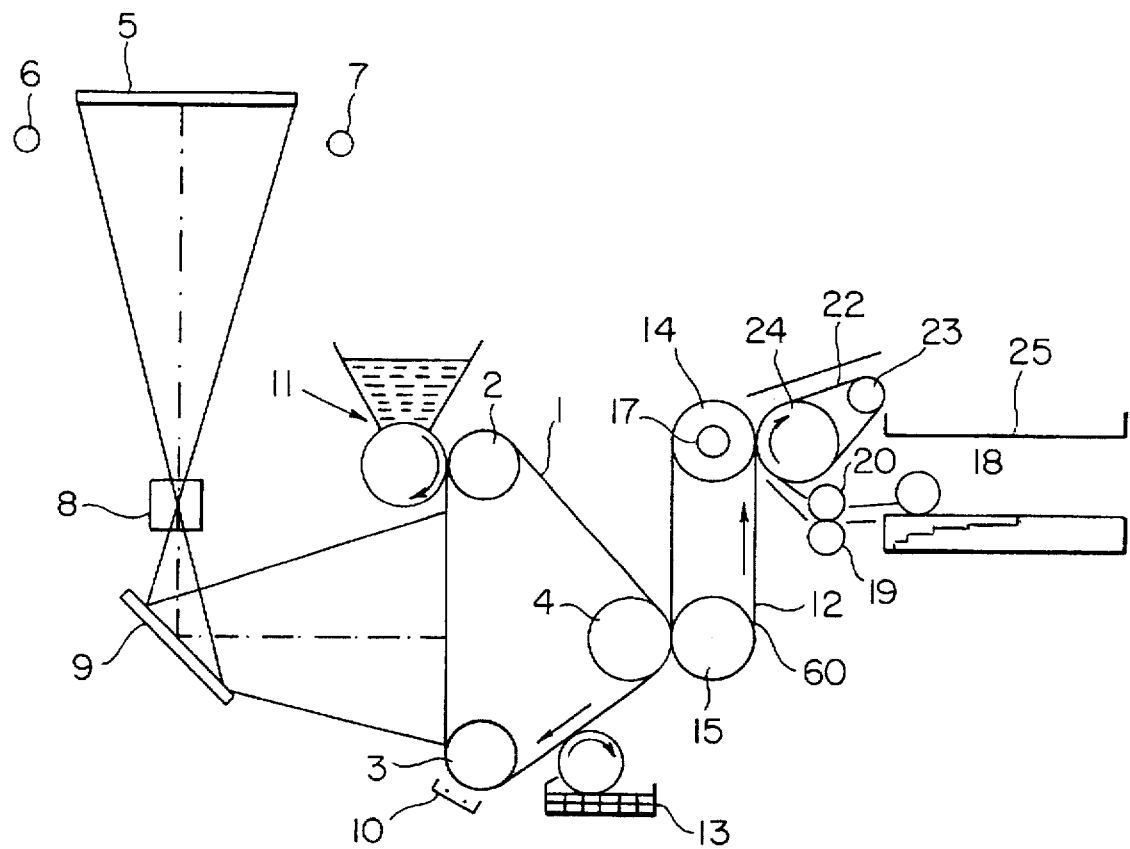
FIG. 1 is a diagrammatic cross-section of one embodiment of the apparatus according to the invention.

The image-forming apparatus shown in FIG. 1 comprises an endless photoconductive belt 1 advanced at a uniform speed by drive and guide rollers 2, 3 and 4 respectively. The image of an original on a window 5 is projected by flashes 6 and 7, a lens 8, and a mirror 9, on to belt 1 after the latter has been electrostatically charged by a corona device 10. The latent charge image is formed on the belt 1 after the flash exposure is developed with toner powder by means of a magnetic brush device 11 to give a toner image which in a first transfer zone is then brought into contact under pressure with an endless intermediate medium belt 12 provided with a top layer 60. The construction of the intermediate medium is in accordance with U.S. Pat. No. 5,361,126, the contents of which are by reference completely included in this application. In these circumstances, the toner image is transferred by adhesive forces from the belt 1 to the belt 12.

After this image transfer, any remaining image residues are removed from belt 1 by means of a cleaning device 13, whereafter the photoconductive belt 1 is ready for fresh use.

The intermediate medium belt 12 is trained over drive and guide rollers 14, 15, the intermediate medium belt 12 being heated to a temperature above the softening temperature of the toner powder, e.g. by means of an infrared radiator 17 disposed inside roller 14. While belt 12 with the toner image thereon is advanced, the toner image becomes tacky as a result of the heating. In a second transfer zone the tacky toner image is then transferred and simultaneously fixed on a sheet of receiving material supplied from reservoir 18 via rollers 19, 20, the transfer being effected under pressure by means of a pressure member in the form of a belt 22 trained over rollers 23 and 24.

Finally, the resulting copy is delivered to a delivery tray 25 by belt 22 trained over rollers 23 and 24.

Instead of heating the roller 14 when a transparent or substantially transparent intermediate medium belt is used, it is possible to heat the intermediate medium belt from within by means of a radiant heater, the radiant heater being situated just before the second transfer zone, so that any toner image on the belt is heated practically directly and very efficiently.

Figure 2:
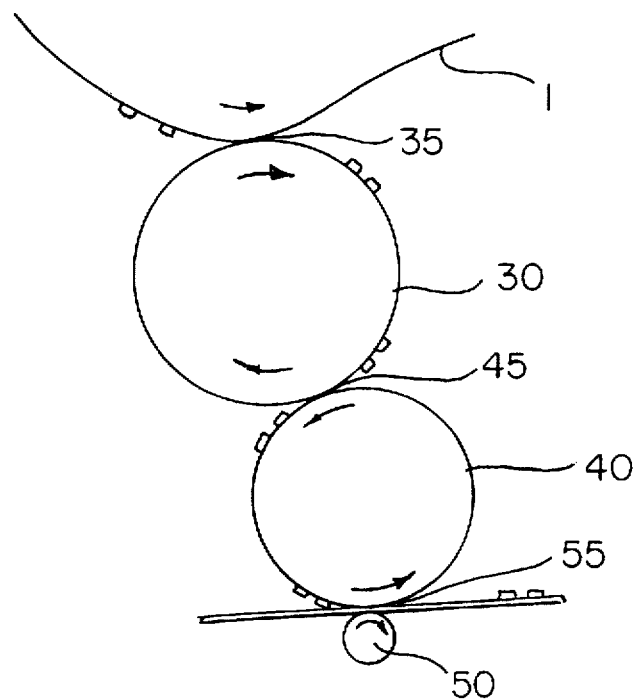
FIG. 2 is a diagrammatic cross-section of another embodiment of the apparatus according to the invention.

FIG. 2 is a cross-section of the apparatus according to the invention wherein an image-forming medium is provided adjacent to an intermediate medium consisting of a first transfer medium 30 and a second transfer medium 40. The transfer media are in the form of metal rollers provided with elastic top layers. A toner image formed on the image-forming medium 1 is transferred to the first transfer medium 30 in the first transfer zone 35. The toner image is then transferred to the second transfer medium 40 in the transfer zone 45. The toner image is then transported to the second transfer zone 55 where the toner image is transferred to a receiving material fed through the nip between the second transfer medium 40 and the pressure member 50. The direction of transport of the toner image is denoted by arrows in the drawing.

The two transfer media 30, 40 can be provided with the perfluoropolyether top layer according to the invention. It is also possible to provide one of the two transfer media with the perfluoropolyether top layer according to the invention. Thus, transfer medium 40 can be provided with the perfluoropolyether top layer according to the invention while transfer medium 30 is provided with a conventional silicone top layer.

EXAMPLE 1

98.1 g (11.2 mmol) of perfluoropolyether diol (HO-perfluoropolyether-OH) (a Fluorolink™ oil made by Ausimont), 25 g of 1,1,2 trifluorotrichloroethane and 5 g of triethylamine were cooled in an ice bath to 0° C. in a 250 ml 4-neck flask provided with an agitator, nitrogen inlet, a closed dropping funnel (with gas circulation) and a spherical condenser. 3 g (33.1 mmol) of acryloyl chloride

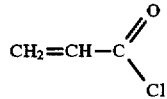

was dissolved in 40 g of 1,1,2 trifluorotrichloro-methane in the dropping funnel. The perfluoropolyether chain mainly contains random polymerized CF2CF2O and CF2O groups. This solution was added dropwise with agitation to the mixture in the 4-neck flask. The resulting white-yellow dispersion was kept at 55° C. for 1 hour, whereupon 50 ml of ethanol was added. The resulting strongly yellow mixture was then agitated for 15 minutes at 50° C. whereupon it was cooled. The acrylate-terminated oil obtained in this way was washed with a 1,1,2 trifluorotrichloroethane/ethanol mixture. After evaporation of the solvents, 87 g (yield 88%) of a clear light-brown acrylate terminated oil remained:

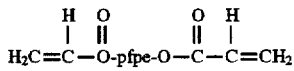

This oil was mixed with a photo-initiator, 20 µl of 2,2 diethoxyacetophenone per 10 g of acrylate terminated oil.

This mixture was applied as a top layer to a metal cylinder provided with an approximately 2 mm thick layer of peroxide hardened silicone rubber. The approximately 60 µm thick top layer was then cured in a nitrogen atmosphere by means of a UV lamp.

The resulting top layer rubber is strong and has sufficient release for toner powder. The glass transition temperature of the top layer rubber is about −125° C.

EXAMPLE 2

Chain lengthening of lower molecular OH terminated perfluoropolyether oils was performed as follows in a 3-neck flask provided with a top agitator, dropping funnel (with gas circulation) and a spherical condenser. The flask was continuously washed with nitrogen. 500 g of OH terminated perfluoropolyether oil, HO-perfluoropolyether-OH, with a mass averaged molecular weight, MW=approximately 2,150 g/mol were weighed into the 3-neck flask. 20.2 g of glutaryl dichloride was added dropwise in 1 hour via the dropping funnel with agitation at 0° C. After 24 hours at 100° C. a viscous substantially clear light orange liquid was obtained. This oil

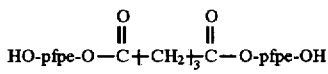

can be converted to top layer rubber in the same way as in Example 1. The above reaction can also be repeated by reacting the product of the reaction with glutaryl dichloride again under the same conditions. The result is the formation of:

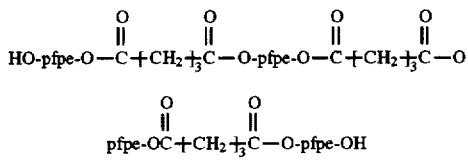

This compound theoretically has an MW of about 8,100 g/mol. In practice, MWs of 6500 (100° C., 24 hours) and 11,000 (160° C., 24 hours), can be found depending on the reaction temperature.

This oil can also be further extended in the same way by again reacting the product for 24 hours at 100° C. with glutaryl dichloride. In this way an OH terminated perfluoropolyether oil was synthesized with an MW of 11,000 (in the case of reaction at 100° C.) and with an MW of 25,000 g/mol in the case of reaction at 160° C.

All these oils can be converted to a top layer rubber in the same way as in Example 1.

EXAMPLE 3

Chain lengthening on the basis of a urethane reaction was carried out in a 250 ml reaction vessel with a top agitator, nitrogen inlet and a thermometer. 50.6 g of OCN-perfluoropolyether'-NCO with an Mw of 2,562 g/mol, 89.3 g of HO-perfluoropolyetherII-OH with an Mw of 2,258 g/mol and 1.5 g of 1 MM catalyst solution 1 W % solution (dibutyl tin dilaurate in 1,1,2 trichloro-trifluoroethane) were reacted together. This reaction mixture was heated for 1 hour at 75° C. under nitrogen. The resulting lengthened perfluoropolyether oil

was then provided with acrylate end groups via the method of Example 1.

By means of benzoyl peroxide and heat the oil provided with 2.5% carbon black was finally converted to a top layer rubber. The mixture with benzoyl peroxide was for this purpose placed in a layer about 60 µm thick on a polyether fabric belt which was provided with a 1.5 mm thick EPDM layer. The layer was then cured at a temperature of about 140° C.

EXAMPLE 4

A top layer rubber was made in the same way as in Example 3, an 80:20 mixture of a perfluoropolyether diol, and

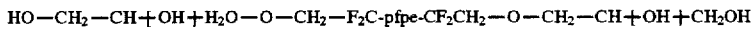

a perfluoropolyether tetraol being used as perfluoropolyether diol.

The presence of the tetraol perfluoropolyether increased the cross-link density after cross-linking with, for example, acrylate groups in the resulting rubber, so that the rubber hardness was increased.

EXAMPLE 5

184.1 g of perfluoropolyether diol with an Mw of about 200, 19.55 g of 2-isocyanoethyl methacrylate

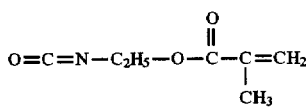

and 0.11 g of dibutyl tin dilaurate were stirred for 4½ hours at room temperature in a 3-neck flask with a condenser, agitator and nitrogen inlet. The resulting product was worked up with 1,1,2 trifluorotrichloroethane and stirred with 20 µl of diethoxyacetophenone per 10 g of perfluoropolyether oil. The product was then cured in one operation in a nitrogen atmosphere by means of a UVlamp (UV-C: wavelength about 360 nm).

After about 15 minutes a well-cured non-stick shiny rubber was obtained with a light-yellow color.

EXAMPLE 6

61.85 g of chain-lengthened perfluoropolyether diol according to Example 2 with an Mw of about 11,000, 2.95 g of 3-(triethoxysilyl) propylisocyanate and 0.65 g of catalyst solution (1 w % dibutyl tin dilaurate in tetrahydrofuran) was agitated at room temperature for 15 hours. NMR analysis of the resulting clear oil showed that the OH groups of the chain-lengthened perfluoropolyether diol were completely converted.

The oil was then mixed with 1 w % tin octate. The resulting mixture was applied in a layer approximately 60 µm thick to a fabric belt provided with about 2.5 mm peroxide hardened silicone rubber. This layer was air cured for about 4 hours. The resulting non-stick clear top layer with very good adhesion to the bottom layer had good visco-elastic properties. The working range for toner transfer and fixing, defined as the temperature interval between adhesion of the toner to normal paper and the permanent sticking of the paper to the intermediate, was greater than with a normal silicone rubber top layer (>26° C. after 30,000 copies instead of <20° C.). The top layer did not exhibit any charge phenomena.

EXAMPLE 7

A carbon-filled tri-ethoxy perfluoropolyether top layer was prepared in the same way as in Example 7 by mixing approximately 1.5% carbon black in the chain-lengthened perfluoropolyether diol oils converted with 3-(triethoxysilyl) propylisocyanate. This carbon-filled triethoxy perfluoropolyether oil was then coated on a thin polyimide foil and cured as in Example 6. Whereas with a normal silicone rubber top layer there was a transfer of low-melting impurities from the receiving materials to the image-forming medium on the polyimide foil after only 9,000 copies, this did not occur with the perfluoropolyether top layer even after 30,000 copies. This indicates the inhibiting action of the perfluoropolyether top layer.

EXAMPLE 8

50 g of perfluoropolyether urethane acrylate (Mw=11,000) was mixed with 50 g of triethoxy silyl perfluoropolyether (Mw=11,000). 1 g of hexafluoroacetylacetonate and 0.5 g of α,α-diethoxyacetophenone were added to the clear mixture and the mixture was then coated on a silicone rubber belt (addition cured). Curing was carried out under inert conditions with a UV lamp for 15 minutes, followed by air curing with RH approximately 60% at 80° C. for 4 hours. The 60 µm thick layer exhibited good adhesion to the substrate. The antistatic layer has permanently good release characteristics for over 30,000 copies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Apparatus for transferring a toner image from an image-forming medium to a receiving medium comprising:
   an endless movable intermediate medium including a support provided with a top layer secured to the support via a rear surface, the intermediate medium being in contact with the image-forming medium in a first transfer zone;
   heating means for heating the toner image on the top layer of the intermediate medium;
   a biasing means for contacting the intermediate medium in a second transfer zone; and
   transport means for transporting the receiving medium through the second transfer zone, wherein the top layer contains a perfluoropolyether rubber.

2. The apparatus according to claim 1, wherein the rubber is prepared with a difunctional perfluoropolyether oil.

3. The apparatus according to claim 2, wherein the rubber is prepared with a difunctional perfluoropolyether diol oil.

4. The apparatus according to claim 3, wherein the difunctional perfluoropolyether oil is prepared by reacting a perfluoropolyether diol with a weight averaged molecular weight (Mn) between 1,500 and 3,000 with a chain lengthener from the group of diacid chlorides or diisocyanates to give a difunctional perfluoropolyether with an Mw between approximately 6,000 and 25,000.

5. The apparatus according to claim 4, wherein the diisocyanate used is a difunctional diisocyanate perfluoropolyether oil.

6. The apparatus according to claims 5, wherein the chain-lengthening perfluoropolyether diol is derivatived with a compound from the group of acryloyl chlorides, isocyanate acrylates according to the molecular formula

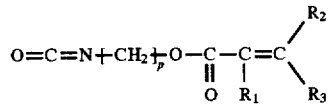

where p=1–5 and $R_1$, $R_2$ and $R_3$ are jointly and independently chosen from H or a lower alkyl group, chosen from the group methyl, ethyl, n-propyl, isopropyl, n-butyl, i-butyl and t-butyl and n-pentyl or with a compound from the group O=C=N—(CH$_2$)p—Si(OR$_4$)$_3$ where p has the same meaning as defined above and $R_4$ is chosen from the group methyl, ethyl, n-propyl and i-propyl, whereafter these derivatived perfluoropolyether oils are cross-linked under the influence of a suitable catalyst.

7. The apparatus according to claim 4, wherein the chain lengthener used is a diacid chloride having the molecular formula

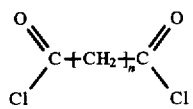

where n=0-4.

8. The apparatus according to claim 7, wherein the chain-lengthener used is glutaryl dichloride.

9. The apparatus according to claim 8, wherein the chain-lengthening perfluoropolyether diol is derivatived with a compound from the group of acryloyl chlorides, isocyanate acrylates according to the molecular formula

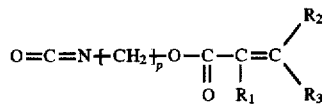

where p=1-5
and $R_1$, $R_2$ and $R_3$ are jointly and independently chosen from H or a lower alkyl group, chosen from the group methyl, ethyl, n-propyl, isopropyl, n-butyl, i-butyl and t-butyl and n-pentyl or with a compound from the group O=C=N—($CH_2$)p— $Si(OR_4)_3$ where p has the same meaning as defined above and $R_4$ is chosen from the group methyl, ethyl, n-propyl and i-propyl, whereafter these derivatived perfluoropolyether oils are cross-linked under the influence of a suitable catalyst.

10. The apparatus according to claim 7, wherein the chain-lengthening perfluoropolyether diol is derivatived with a compound from the group of acryloyl chlorides, isocyanate acrylates according to the molecular formula

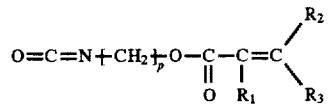

where p=1-5
and $R_1$, $R_2$ and $R_3$ are jointly and independently chosen from H or a lower alkyl group, chosen from the group methyl, ethyl, n-propyl, isopropyl, n-butyl, i-butyl and t-butyl and n-pentyl or with a compound from the group O=C=N—($CH_2$)p— $Si(OR_4)_3$ where p has the same meaning as defined above and $R_4$ is chosen from the group methyl, ethyl, n-propyl and i-propyl, whereafter these derivatived perfluoropolyether oils are cross-linked under the influence of a suitable catalyst.

11. The apparatus according to claim 4, wherein the chain-lengthening perfluoropolyether diol is derivatived with a compound from the group of acryloyl chlorides, isocyanate acrylates according to the molecular formula

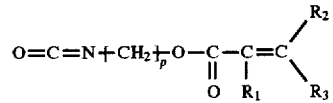

where p=1-5
and $R_1$, $R_2$ and $R_3$ are jointly and independently chosen from H or a lower alkyl group, chosen from the group methyl, ethyl, n-propyl, isopropyl, n-butyl, i-butyl and t-butyl and n-pentyl or with a compound from the group O=C=N—($CH_2$)p— $Si(OR_4)_3$ where p has the same meaning as defined above and $R_4$ is chosen from the group methyl, ethyl, n-propyl and i-propyl, whereafter these derivatived perfluoropolyether oils are cross-linked under the influence of a suitable catalyst.

12. Apparatus for transferring a toner image from an image-forming medium to a receiving medium comprising:

an endless movable intermediate medium including a support provided with a top layer secured to the support via a rear surface, the intermediate medium being in contact with the image-forming medium in a first transfer zone;

heating means for heating the toner image on the top layer of the intermediate medium;

a biasing means for contacting the intermediate medium in a second transfer zone; and transport means for transporting the receiving medium through the second transfer zone, wherein the top layer contains a perfluoropolyether rubber; and wherein the perfluoropolyether rubber contains linear $(CF_2CF_2O)_n(CF_2O)_m$ chains.

13. The apparatus according to claim 12, wherein the rubber is prepared with a difunctional perfluoropolyether oil.

14. The apparatus according to claim 13, wherein the rubber is prepared with a difunctional perfluoropolyether diol oil.

15. The apparatus according to claim 14, wherein the difunctional perfluoropolyether oil is prepared by reacting a perfluoropolyether diol with a weight averaged molecular weight (Mn) between 1,500 and 3,000 with a chain lengthener from the group of diacid chlorides or diisocyanates to give a difunctional perfluoropolyether with an Mw between approximately 6,000 and 25,000.

* * * * *